May 26, 1942. W. H. BASELT ET AL 2,284,253
ROTOR BRAKE
Filed July 3, 1940 4 Sheets-Sheet 1
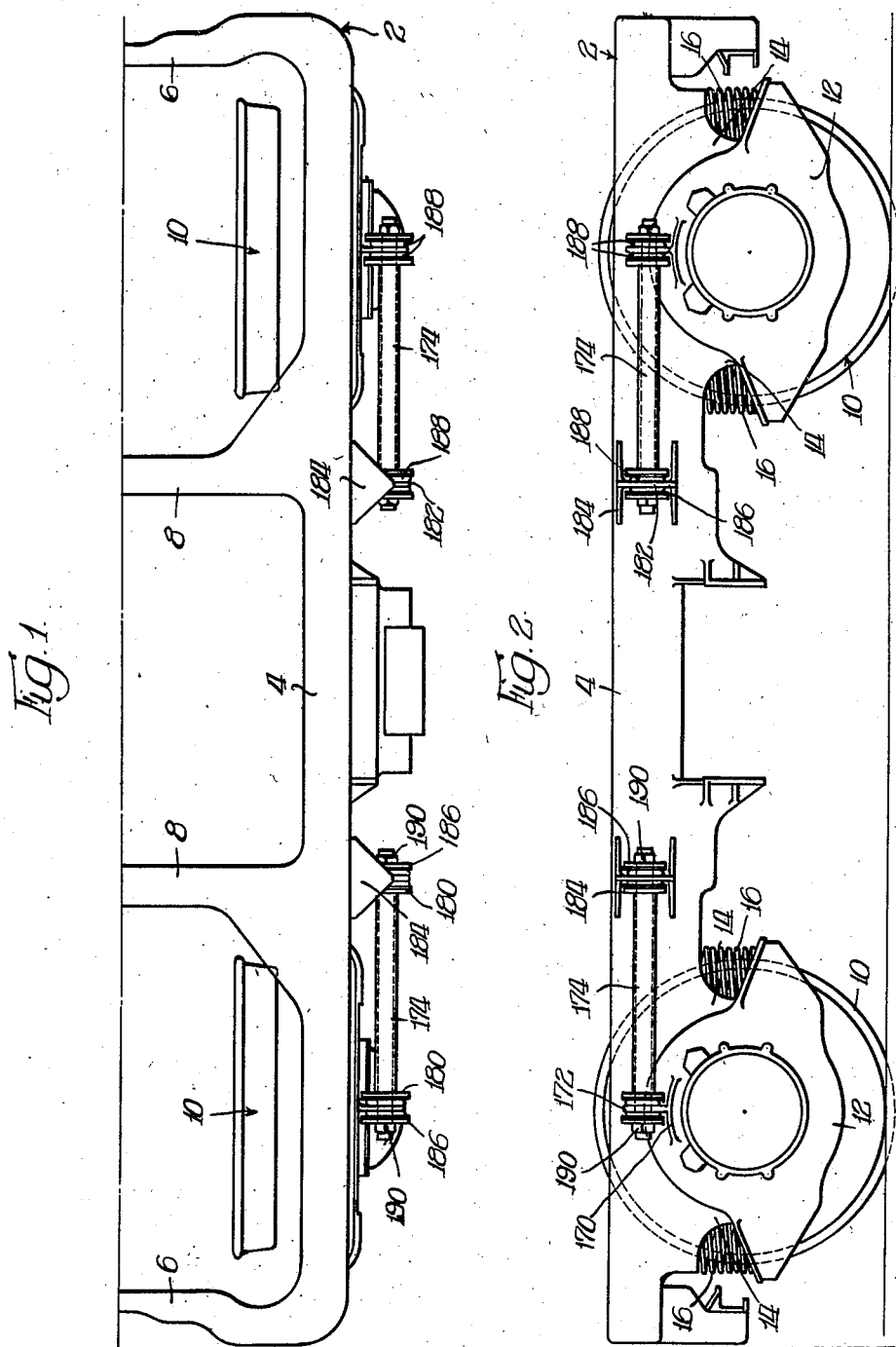
INVENTORS
Walter H. Baselt,
Carl E. Tack,
BY

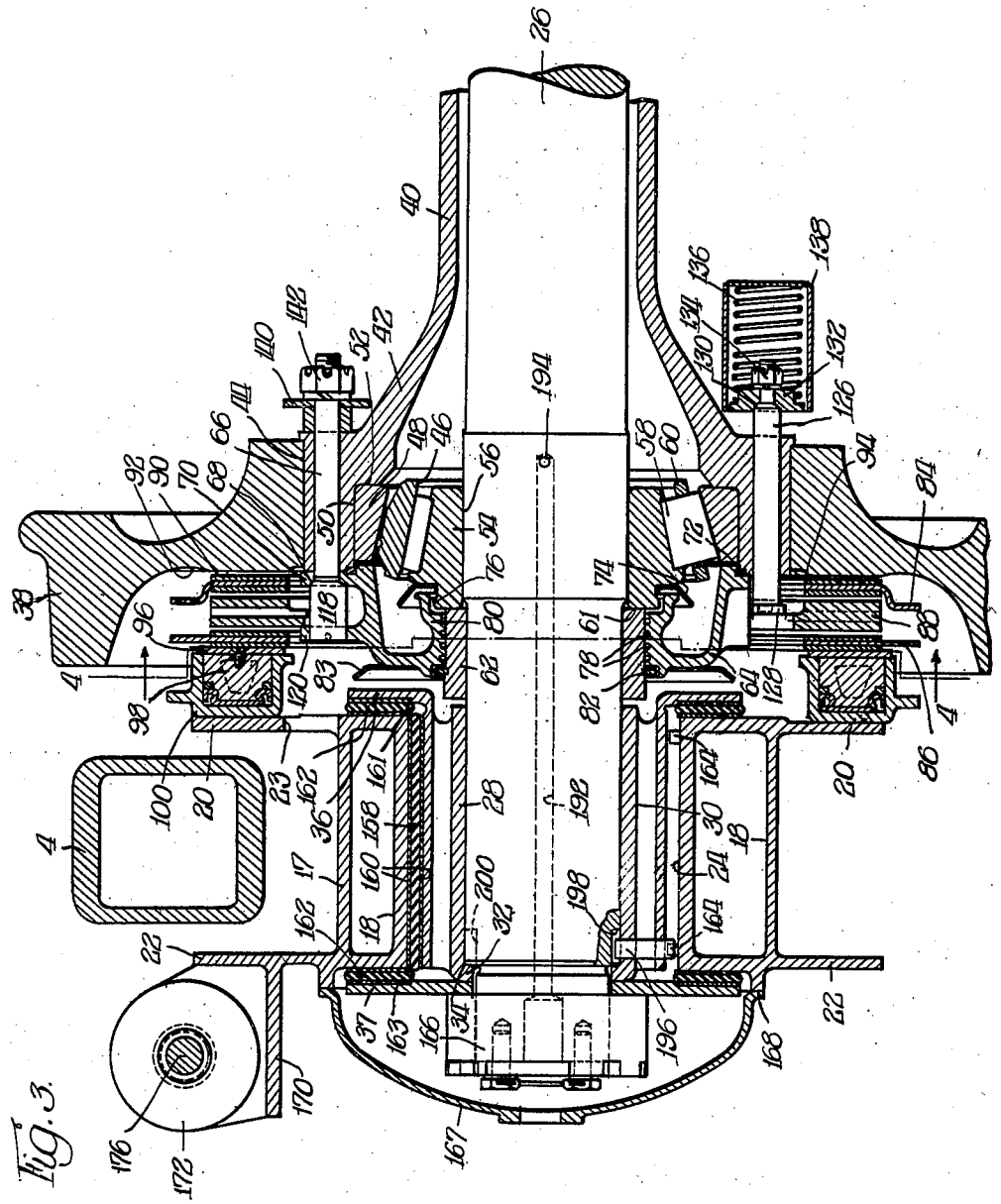

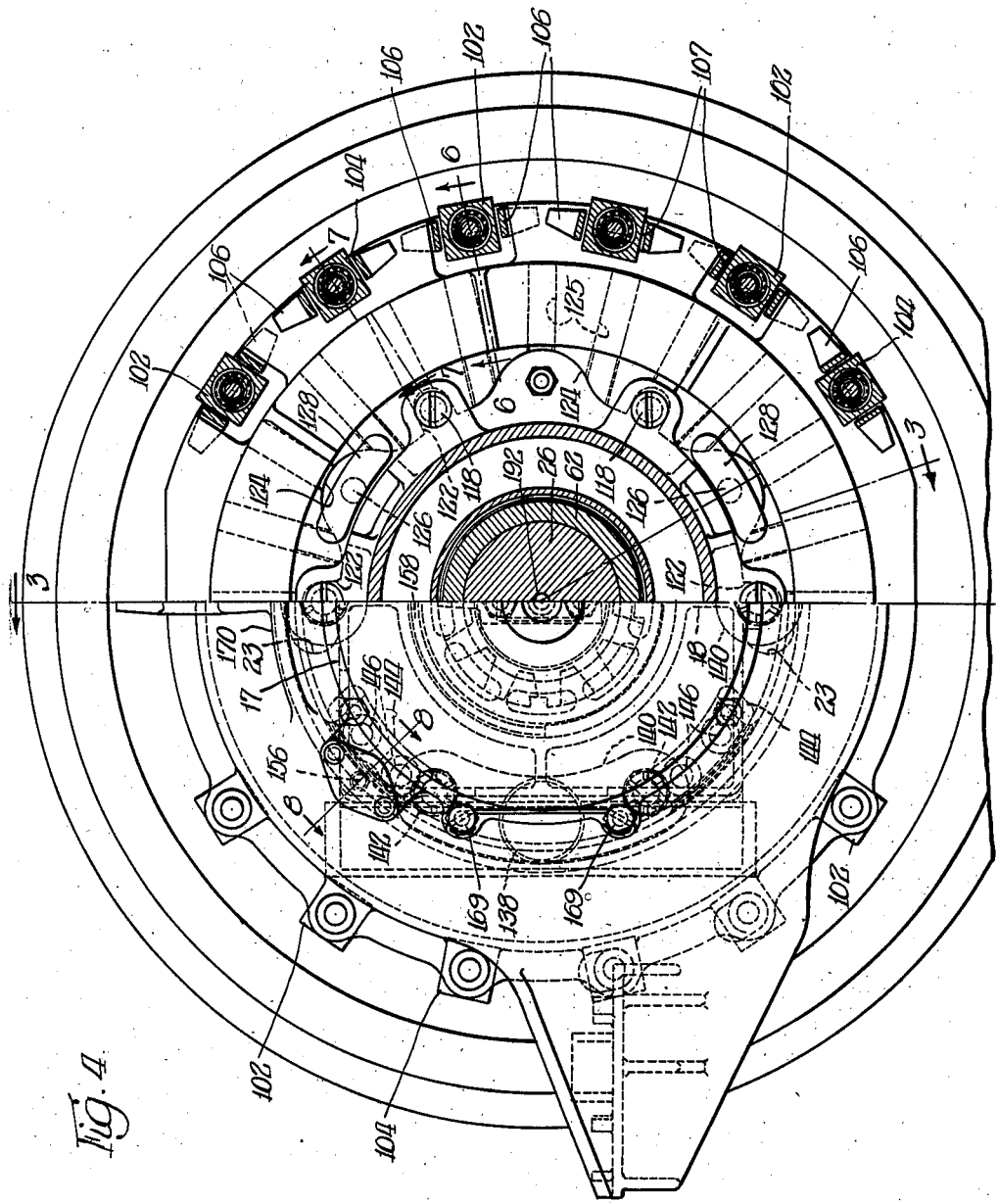

May 26, 1942. W. H. BASELT ET AL 2,284,253
ROTOR BRAKE
Filed July 3, 1940 4 Sheets-Sheet 4
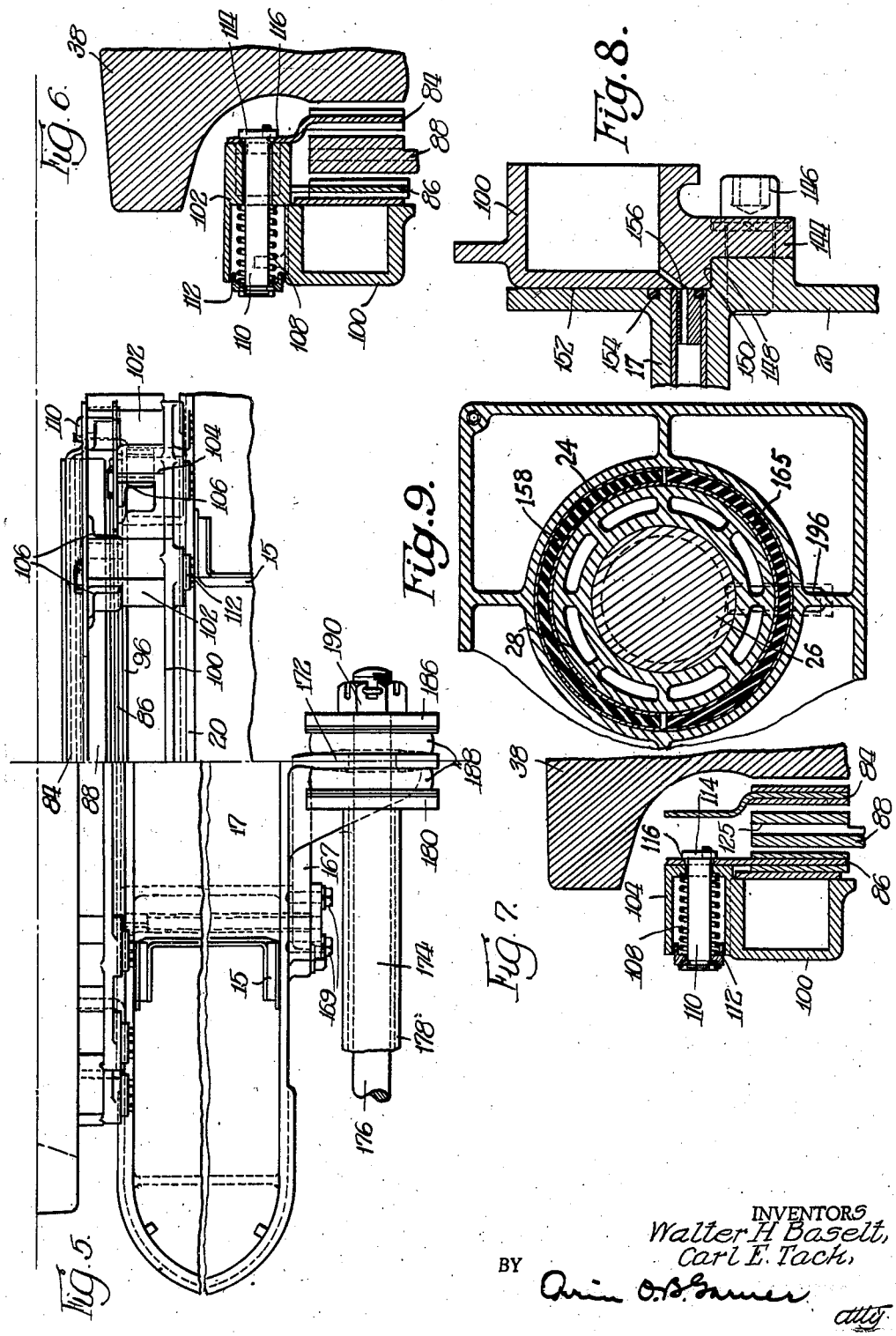
INVENTORS
Walter H Baselt,
Carl E. Tack,
BY
ATTY.

Patented May 26, 1942

2,284,253

UNITED STATES PATENT OFFICE 2,284,253

ROTOR BRAKE

Walter H. Baselt and Carl E. Tack, Chicago, Ill., assignors to American Steel Foundries, Chicago, Ill., a corporation of New Jersey Application July 3, 1940, Serial No. 343,770

31 Claims. (Cl. 188—153)

Our invention relates to brake arrangements, and more particularly to a disk brake having interleaved rotors and stators operable between an outboard journal box and the wheel of a railway wheel and axle assembly.

Our invention contemplates such a disk brake arrangement wherein the operating means and stators may be resiliently supported on the projecting end of an inner axle through a novel arrangement of resilient pads between the journal box and said projecting end.

An object of our invention is to support the power means of such a disk brake on a journal box in such manner that torque developed by said brake is transmitted through shear lugs to said box.

Our invention also comprehends a torque connection between the frame and the journal box of a railway vehicle utilizing a rubber insulated torque rod. Our novel torque connection also acts as a steadying and stabilizing means for the wing type journal box and thus reduces tipping thereof which is an undesirable characteristic of such journal boxes.

Another object of our invention is to afford means preventing rotation of the inner axle so that the radial oil hole therein may be retained in a horizontal neutral plane, thus reducing stress concentrations adjacent said hole due to vertical loads.

A further object of our invention is to provide means for preventing excess oil from being thrown upon the disc-braking surfaces.

Figure 1 is a top plan view of a car truck embodying our invention, only one half of said truck being shown inasmuch as the other half is similarly arranged.

Figure 2 is a side elevation of the truck structure shown in Figure 1.

Figure 3 is a fragmentary sectional view of one of the wheel and axle assemblies in Figure 1 showing our novel invention in greater detail, the section being taken substantially in the transverse planes indicated by line 3—3 of Figure 4.

Figure 4 is a fragmentary side elevation of one of the wheel and axle assemblies shown in Figure 1, the left half being a side elevation thereof with the torque arm removed and the right half being a sectional view taken substantially in the vertical planes indicated by line 4—4 of Figure 3.

Figure 5 is a fragmentary top plan view of the structure shown in Figure 4, the left half being a view outwardly of the ring cylinder showing a top view of the journal box and our novel torque connection and the right half being a top plan view inboard of the journal box showing the ring cylinder and the stators.

Fig. 6 is a fragmentary sectional view, the section being taken substantially in the transverse plane indicated by the line 6—6 of Figure 4.

Figure 7 is a fragmentary sectional view, the section being taken substantially in the planes indicated by line 7—7 of Figure 4.

Figure 8 is a fragmentary sectional view showing the manner of securing the ring cylinder to the journal box, said section being taken substantially in the plane indicated by line 8—8 of Figure 4.

Figure 9 is a fragmentary sectional view showing another arrangement of the resilient pads between the journal box and the sleeve, the section being taken in substantially a vertical transverse plane bisecting the journal box.

Describing our novel structure in greater detail, the truck frame generally indicated at 2 comprises a longitudinal side member 4, transverse end and intermediate members 6, 6 and 8, 8 and a load supporting member (not shown). Each wheel and axle assembly generally indicated at 10, supports the truck frame through wing-type journal boxes 12, 12 received between the spaced pedestal jaws 14, 14 integrally formed on the side member 4, said truck frame being resiliently supported by the load supporting springs 16, 16 interposed between the wing portions of the journal box and the side member 4. A channel shaped wear plate 15 (Figure 5) may be secured on opposite sides of said journal box for engagement with the pedestal jaws 14, 14.

The journal box 12 comprises a rectangular box portion 17 (Figure 3) cored as at 18, 18 and the vertical inboard and outboard walls 20 and 22 integrally formed therewith, said inboard wall having spaced openings 23, 23 affording air circulation. The central opening 24 of said journal box receives the projecting end of the inner non-rotating axle 26, said projecting end having a sleeve 28 seated therearound, said sleeve being cored as at 30 for convenient foundry practice. The sleeve 28 has an outboard radially inwardly directed annular flange 32 abutting the outboard edges of the shoulder 34 on said axle 26, and has the inboard radially outwardly directed annular flange 36 affording with the spaced circular backing plate 37 retaining means for our novel arrangement of resilient pads interposed between the journal box 12 and the sleeve 28, the flange 36, and the backing plate 37, said arrangement being hereinafter more particularly described.

Sleeved over the inner axle 26 may be the outer axle or housing 40 having a bell-shaped end 42 with the wheel 38 press-fitted thereon as at 44. The antifriction bearing 46 received within said bell-like end between the inner and outer axles comprises the outer race or cup 48 press-fitted as at 50 within the bell-shaped end in abutment with the shoulder 52 on said outer axle. The inner race or cone 54 may be press-fitted as at 56 on said inner axle, and the spaced rollers 58, 58 between said races may be held in normal relationship by the cage 60. The outboard edge of the inner race or cone 54 extends slightly beyond the outboard edge of the shouldered portion at 56 and abuts as at 61 the collar 62 shrunk on the inner axle between the cone 54 and the sleeve 28. A bearing lubricant cavity is afforded by the closure plate 64 secured to said outer axle by the rotor supporting bolts 66, 66, each of said bolts having a tapered shoulder 68 seated in a lug 70 on the said closure plate for tightly retaining said plate. Escape of lubricant from the bearing cavity may be prevented by the gasket 72 compressed between the closure plate and the outboard edges of the outer axle. An oil deflector 74 is seated in the annular channel defined by the pulling shoulder 76 on the inner race. The series of annular grooves 78, 78 formed around the inner circumference of the flange 80 on the closure plate, and the baffle ring 82 define a labyrinthine passage designed to retain the lubricant. An outwardly directed oil flinger 83 may be secured in any convenient manner on the outboard face of the closure plate to deflect excess oil outwardly and away from the braking means.

Our novel braking means comprises the inboard and outboard stators 84 and 86, the rotor 88 interposed between said stators and the annular braking surface 90 formed on the outboard face of said wheel by the relieved portions 92 and 94. Each stator 84 and 86 corresponds generally to the braking element described in the copending application Serial No. 306,709 filed in the Patent Office November 29, 1939, in the name of Carl E. Tack, and comprises briefly a circular flexible steel disk having spaced pads of relatively hard metal fused on opposite sides thereof. The outboard stator 86 abuts the annular insulator 96 secured to the face of the piston 98 operable in the ring cylinder 100. As best viewed in Figures 4, 6 and 7, the stators 84 and 86 may be supported respectively from alternating spaced inboardly directed lugs or studs 102, 102 and 104, 104 formed on the outer circumference of the ring cylinder 100. The angles 106, 106 may be secured to each stator on opposite sides of the respective supporting lugs for abutment therewith as at 107, 107, said angles holding said stators against rotation while permitting axial movement thereof.

Release means for the stators are provided by the compression springs 108, 108 housed in the hollow studs 102, 102 and 104, 104. Extending through said springs 108, 108 and said studs may be the release spring plunger pins 110, 110 having retainers 112, 112 on their outboard ends affording seats for said springs and having on their inboard ends heads 114, 114 in abutment as at 116, 116 with the respective stators.

The rotor 88 may be supported from the elongated heads 118, 118 on the rotor supporting bolts 66, 66; said heads having bearing in aligned spaced outboard lugs 120, 120 (Figure 3) on the closure plate 64. Spaced slots 122, 122 (Figure 4) on the inner circumference of said rotor engage said heads 118, 118 for axial movement therealong. Alternating with said slots 122, 122 are larger spaced slots 124, 124 affording convenient means for dismantling said rotor by rotating it, after bolts 66, 66 are withdrawn, so that the slots 124, 124 are aligned with the lugs 120, 120 and then slipping the rotor over said lugs. Spaced radial slots 125, 125, formed in said rotor, afford passageways for air cooling.

Release means for the rotor 88 are afforded by the spaced release pins 126, 126 each having a T-shaped head 128 bridging a slot 124 for abutment with the adjacent inner circumference of said rotor and extending inboardly through the bell-shaped end of the outer axle for abutment as at 130 with the spring cap 132 and threaded engagement with the nut 134 retaining said spring cap. Seated on each spring cap 132 may be the compression spring 136 enclosed in the cylindrical housing 138, which may be welded to an arcuate segmental plate 140 secured at opposite ends to the wheel by the nuts 142, 142 in threaded engagement with the rotor supporting bolts 66, 66.

The power means includes the before-mentioned ring type cylinder 100 and the annular piston 98 operable therein, said cylinder 100 being secured on the inboard wall 20 of the journal box in concentric relationship with the inner axle through spaced shear lugs 144, 144 (Figures 4 and 8) integrally formed on the inner circumference of said cylinder and the securing bolts 146, 146. Each spaced inboardly directed projection 148 on the inboard wall 20 affords a precise and accurate seat for said cylinder as at 150. As the bolts 146, 146 are tightly drawn, the cylinder is urged into tight abutment against the inboard wall of the journal box as at 152 and compresses the resilient gasket 154 around the air inlet 156 to afford a tight seal for the fluid actuating medium.

The novel cushioning means previously referred to affords resilient support for said power means and said stators and comprises a semi-cylindrical resilient pad 158 faced on opposite sides thereof with metal plates 160, 160 secured thereto in any convenient manner as by vulcanizing, and interposed between the sleeve 28 and the journal box 12 above the projecting end of the inner axle. Metal faced annular resilient pads 162, 162 encircling said inner axle may be inserted between the journal box and the inboard flange 36 and the outboard backing plate 37, said flange 36 and plate 37 being relieved on their inner surfaces as at 161 and 163 respectively to afford seats for said pads 162, 162. It is apparent that the ring cylinder is resiliently cushioned against vertical forces by the compression of pad 158 and shear of pads 162, 162, and the reaction of the power means or other laterally acting forces is taken by compression in the pads 162, 162 and shear in the pad 158. Spaced semi-cylindrical ribs 164, 164 may be interposed between the sleeve 28 and the journal box below the inner axle.

As shown in Figure 9, our invention comprehends replacing said ribs 164, 164 with a semi-cylindrical resilient pad 165 which is interposed between the lower half of the sleeve and the journal box. In this arrangement the sleeve 28 is completely inclosed with the resilient cushioning pads 158 and 165, and it will be understood that a cylindrical resilient pad may be used instead of the two semi-cylindrical pads.

The annular backing plate 37 may be retained around the inner axle in annular abutment with the outboard flange 32 of the sleeve 28 by the lock nut 166 threaded on the outer end of the inner axle. A circular cover plate 167 having annular abutment as at 168 with the journal box encloses the lock nut 166 and the backing plate 37, and may be secured to the journal box by spaced bolts 169, 169.

Integrally formed with the outboard wall of the journal box may be the outwardly projecting shelf or flange 170 having a vertically disposed rib 172 affording means for connection to the torque arm 174 connecting said journal box and said truck frame. The torque arm 174 comprises a rod 176 enclosed in a tube or casing 178 having at opposite ends thereof circular plates or disks 180, 180 welded thereto. The opposite ends of the rod 176 extend beyond said plates 180, 180 through aligned openings in the rib 172 and a similarly disposed vertical rib 182 formed on the bracket 184 on the side member 4, the circular washers 186, 186, and the resilient pads 188, 188 interposed between said ribs and the disks and washers 180, 180 and 186, 186. Nuts 190, 190 may be threaded on the opposite ends of said rod 176 and tightened to compress the resilient pads 188, 188. It will be noted that besides transmitting torque forces developed by the braking means to the truck frame, the resiliently mounted torque rod 174 also reduces tipping of the journal box, an undesirable condition commonly occurring in wing-type journal boxes.

The longitudinal axial oil hole 192 (Figure 3) and the radially horizontal oil hole 194 associated with said hole 192 in the inner nonrotating axle affords means for injecting lubricant into the lubricant cavity. The radial hole 194 may be retained in a horizontal plane by a pin 196 inserted through the sleeve 28 and into the aligned recess 198 formed in the outer circumference of the inner axle adjacent the end thereof. It will be noted that the retention of the radial oil hole 194 in the neutral horizontal plane greatly reduces stress concentrations in the inner axle adjacent said hole 194 due to vertical loads. Diametrically opposite the recess 198 may be formed a corresponding recess 200 affording similar means for retaining said axle and said oil hole 194 in a horizontal position spaced 180 degrees from that just described, the pin 196 engaging said recess 200. Thus that part of the axle subjected to tension may be relieved therefrom and the part formerly in compression may be subjected to tension while the radial oil hole 194 is retained in a neutral plane and undue stress concentrations are substantially reduced.

In operation, the piston 98 moves the stators and rotors axially into a pile against the braking surface 90 on the wheel for frictional engagement with each other. On release of the power means, the before-described release means for the stators and rotors serve to return them to their normal positions.

It is to be understood that we do not wish to be limited by the exact embodiment of the device shown which is merely by way of illustration and not limitation as various and other forms of the device will, of course, be apparent to those skilled in the art without departing from the spirit of the invention or the scope of the claims.

We claim:

1. In a vehicle, a frame member, a supporting wheel and axle assembly comprising a wheel, rotating and nonrotating axles, a sleeve positioned on the end of said nonrotating axle, a journal box having inboard and outboard walls encircling said sleeve, a plate abutting said sleeve, braking means comprising rotors and stators supported respectively from said wheel and the inboard wall of said journal box, actuating means supported from said inboard wall and operable to bring said rotors and stators into frictional engagement, resilient pads compressed between said journal box and said sleeve and plate for cushioning relative movement between said journal box and said nonrotating axle, and a resiliently mounted torque arm connecting said frame member and the outboard wall of said journal box.

2. In a vehicle, a frame member, a supporting wheel and axle assembly comprising a wheel, rotating and nonrotating axles, bearings between said axles, a closure plate, a sleeve on the end of said nonrotating axle, a journal box, rotors supported from said wheel and said closure plate, stators and power means resiliently mounted on said nonrotating axle, said power means being operable to move said rotors and stators into frictional engagement, said resilient support comprising a plurality of resilient pads arranged for cushioning relative movement between said journal box and said nonrotating axle, and a torque arm resiliently connected between said journal box and said frame member.

3. In a railway brake, a frame member, a supporting wheel and axle assembly comprising inner and outer axles, a wheel, bearings between said axles, a closure plate forming a bearing cavity, a radial oil hole in said inner axle, a sleeve on said inner axle, a journal box supporting said frame member, rotors supported from said wheel and said closure plate, stators and power means resiliently supported on the end of the inner axle, said power means being operable to move said rotors and stators into frictional engagement, and means engaging said sleeve and said inner axle for retaining said oil hole in a neutral plane whereby stress concentrations due to vertical loads are reduced.

4. In a railway vehicle, a frame member, a supporting wheel and axle assembly comprising a wheel, inner and outer axles, a sleeve on the end of said inner axle, a journal box, braking means comprising alternately arranged rotors and stators supported between said wheel and said journal box, power means for urging said rotors and stators into frictional engagement, a resilient support for said stators and power means comprising resilient pads on opposite sides of said journal box, a resilient pad between said journal box and sleeve, and retaining means for said pads comprising a flange on said sleeve and a backing plate on said axle.

5. In a vehicle, a frame member, a supporting wheel and axle assembly comprising a wheel, inner and outer axles, and a journal box, braking and power means supported concentrically of said axles between said journal box and said wheel, said braking means comprising interleaved rotors and stators, said power means being operable to move said rotors and stators into frictional engagement with each other, and resilient support means for said power means and certain of said braking means and comprising a plurality of resilient pads compressed between said journal box and said inner axle.

6. In a railway braking mechanism, a frame member, a supporting wheel and axle assembly comprising a wheel, rotating and nonrotating axles, a sleeve and backing plate on the end of said nonrotating axle, a securing member, rotors supported from said wheel, stators and power means resiliently mounted on said end, said power means urging said rotors and stators into frictional engagement, said resilient mounting comprising a plurality of resilient pads between said journal box and said sleeve and backing plate, whereby the reaction of said power means is resiliently transmitted to said securing member.

7. In a vehicle, a frame member, a supporting wheel and axle assembly comprising an inner axle, an outer axle having a wheel thereon, a journal box resiliently supported on said inner axle, bearings between said axles, a bearing cavity, braking means comprising rotors and stators supported respectively from said wheel and said inner axle, power means supported on said journal box, radial lubricating means in said inner axle affording access to said cavity, and means holding said inner axle against rotation and retaining said lubricating means in a neutral plane.

8. In a vehicle, a frame member, a supporting wheel and axle assembly comprising an inner axle, an outer axle with a wheel thereon, antifriction bearings between said axles, a closure plate therefor, rotatable braking elements supported from said wheel and closure plate, stationary braking elements and power means resiliently supported from said inner axle, said power means being operable to urge said elements into frictional engagement, and means on said closure plate for deflecting excess lubricant away from said braking elements.

9. In a vehicle, a frame member, supporting wheel and axles, a journal box, a sleeve on one of said axles, rotatable and stationary braking elements supported between said wheel and said journal box, power means operable to move said elements into frictional engagement, cushioning means for said stationary elements and said power means comprising a resilient pad between said sleeve and journal box, other resilient pads seated against inboard and outboard walls of said journal box, and retaining means for said resilient pads.

10. In a braking mechanism, a frame member, a supporting wheel and axle assembly including a wheel, rotating and nonrotating axles, a sleeve and a backing plate on said nonrotating axle, a journal box, rotors supported from said wheel, stators and actuating means resiliently supported on said nonrotating axle, said actuating means being operable to move said rotors and stators into frictional engagement, said resilient support including resilient pads disposed between said journal box and said sleeve and plate.

11. In a braking mechanism, a frame member, a supporting wheel and axle assembly comprising a wheel, inner and outer axles, a sleeve on the projecting end of the inner axle, a journal box encircling said sleeve, resilient pads affording a floating support for said journal box, braking means comprising rotatable and stationary braking elements supported respectively from said wheel and said journal box, actuating means on said journal box for said braking means, and retaining means for said resilient pads supported on said projecting ends.

12. In a railway vehicle, a frame member, a supporting wheel and axle assembly comprising a wheel, inner and outer axles, a journal box, a sleeve and a journal box supported on the end of said inner axle, braking means comprising interleaved rotors and stators operable between said journal box and said wheel, actuating means for said braking means, and a resilient mounting for said stators and said actuating means comprising resilient pads disposed for cushioning relative movement between said journal box and said inner axle.

13. In a braking mechanism, a frame member, a supporting wheel and axle assembly comprising a wheel, inner and outer axles, a journal box, rotors and stators supported respectively from said wheel and the end of said inner axle, power means supported on said journal box and operable to actuate said rotors and stators, and means on the end of said inner axle for cushioning the reaction of said power means, said means comprising a plurality of resilient pads affording a floating support for said journal box on the end of said inner axle.

14. In a vehicle, a frame member, a supporting wheel and axle assembly comprising a wheel, rotating and nonrotating axles, a sleeve having a positioning flange engaging the end of said nonrotating axle, a journal box having a central opening encircling said sleeve, means enclosing the edges of said opening, rotors supported from said wheel, stators and power means supported from said journal box, and cushioning means for said journal box comprising a plurality of resilient pads interposed between said journal box and said sleeve and enclosing means.

15. In a vehicle, a frame member, a supporting wheel and axle assembly comprising rotating and nonrotating axles, a wheel and a journal box mounted respectively on said rotating and nonrotating axles, braking and power means between said journal box and said wheel, said braking means including interleaved rotors and stators supported respectively from said wheel and said nonrotating axle, said power means being operable to move said rotors and stators axially into frictional engagement with each other, and a torque arm resiliently connected at its ends to said box and said frame respectively.

16. In a vehicle, a frame member, a supporting wheel and axle assembly comprising an outer axle having a wheel thereon, an inner axle having a projecting end, a journal box resiliently mounted on said projecting end and having inboard and outboard walls, braking means comprising rotors and stators supported respectively from said wheel and said inner axle, power means mounted on the inboard wall of said journal box, and a resiliently mounted torque arm connecting said frame member and said outboard wall.

17. In a vehicle, a frame member, a supporting wheel and axle assembly comprising an inner axle, an outer axle having a wheel thereon, a journal box on said inner axle, braking means comprising interleaved rotors and stators supported respectively from said wheel and said inner axle, power means resiliently supported from said inner axle, and retaining means for said journal box comprising a resiliently mounted member connecting said journal box and said frame.

18. In a vehicle, a frame member, a supporting wheel and axle assembly comprising a wheel, inner and outer axles, a journal box, a sleeve on said inner axle, rotors and stators supported between said wheel and said journal box, power means supported from said inner axle and operable to move said rotors and stators into frictional engagement, and cushioning means for said stators and power means comprising resilient pads interposed between said sleeve and said journal box.

19. In a railway vehicle, a frame member, a supporting wheel and axle assembly comprising a wheel, inner and outer axles, a journal box, braking means comprising alternately arranged rotors and stators supported between said wheel and said journal box, power means for urging said rotors and stators into frictional engagement, a plurality of resilient pads affording a floating support for said stators and actuating means, and retaining means for said pads.

20. In a vehicle, a frame, a supporting wheel and axle assembly comprising inner and outer axles, a frame supporting member resiliently mounted on an end of said inner axle, interleaved rotors and stators supported respectively by said wheel and said member, and operable means supported by said member for frictionally engaging said rotors and stators.

21. In a vehicle, a frame, a supporting wheel and axle, a frame supporting member on said axle, rotors driven by said wheel, stators and operable means supported on said member, and resilient means encircling said axle and engaging said member for cushioning movement thereof, said resilient means comprising a pad between said member and said axle and a pad supported at each side of said member.

22. In a vehicle, a frame, a supporting wheel and axle, a frame supporting member, braking means between said member and said wheel comprising rotors driven by said wheel and stators supported by said member, operable means mounted on said member, and resilient means carried by said axle and affording a floating support for said stators and operable means.

23. In a vehicle, a frame, a supporting wheel and axle, a frame supporting member, braking means between said member and said wheel comprising rotors driven by said wheel and stators supported by said member, operable means mounted on said member, and resilient means carried by said axle and affording a floating support for said stators and operable means, certain of said resilient means being arranged to cushion lateral movement of said member.

24. In a vehicle, a frame, a supporting wheel and axle, a frame supporting member, braking means between said member and said wheel comprising rotors driven by said wheel and stators supported by said member, operable means mounted on said member, and a plurality of resilient means encircling said axle and adapted to cushion movement of said member in a plurality of directions.

25. In a vehicle, a frame, a supporting wheel and axle, a frame supporting member, means on said axle floatingly supporting said member, interleaved rotors and stators between said wheel and said member and supported thereby respectively, and operable means mounted on said member for actuation of said rotors and stators.

26. In a vehicle, a frame, a supporting wheel and axle, a frame supporting journal box, interleaved braking elements supported between said wheel and said member, operable means for said braking elements, and means between said journal box and said axle affording a resilient support for certain of said braking elements.

27. In a vehicle, a frame, a supporting wheel and axle, a frame supporting member, interleaved braking elements supported between said wheel and said member, operable means for moving said elements into engagement, and means on said axle for cushioning reaction of said operable means.

28. In a vehicle, a frame, a supporting wheel and axle, a frame supporting member, interleaved braking elements and operable means supported between said wheel and said member, a sleeve on said axle, resilient means between said sleeve and said member, and a torque transmitting member resiliently connected at its ends to said frame and said frame supporting member respectively.

29. In a vehicle, a supporting wheel and axle assembly comprising inner and outer axles, a lubricant cavity between said axles, said inner axle affording access to said cavity, and means retaining said first-mentioned means in a neutral plane, a frame supporting member, a rotatable brake element driven by said wheel, a non-rotatable brake element supported by said member, power means mounted on said member for frictionally engaging said elements, and resilient means supported by said axle and affording a yielding support for said power means and said non-rotating brake element.

30. In a vehicle, a supporting wheel and axle assembly comprising inner and outer axles, a lubricant cavity between said axles, a closure plate therefor, a frame supporting member on said inner axle, a rotatable brake element driven by said wheel, a non-rotatable brake element supported by said member, power means mounted on said member for frictionally engaging said elements, means encircling said axle for yieldingly supporting said power means and certain of said brake elements, and means on said plate for deflecting excess lubricant from said brake elements.

31. In a vehicle, a frame, a supporting wheel and axle, a frame supporting member on said axle having a central opening, a rotor driven by said wheel, a stator and power means supported from said member, and resilient means sleeved within said opening and embracing the marginal areas thereof to resiliently support said member, and torque transmitting means resiliently connected to said frame and said frame supporting member.

WALTER H. BASELT.
CARL E. TACK.